United States Patent [19]

Oberle et al.

[11] Patent Number: 4,848,482
[45] Date of Patent: Jul. 18, 1989

[54] MACHINE FOR WORKING SOIL

[75] Inventors: Edmond M. Oberle, Saverne; Jean M. Klein, Bouxwiller, both of France

[73] Assignee: Kuhn s.a., Saverne, France

[21] Appl. No.: 110,849

[22] Filed: Oct. 21, 1987

[30] Foreign Application Priority Data

Oct. 22, 1986 [FR] France ............... 86 14767

[51] Int. Cl.⁴ .............................. A01B 19/06
[52] U.S. Cl. .................... 172/54.5; 172/60; 172/102
[58] Field of Search ............. 172/54.5, 60, 102

[56] References Cited

U.S. PATENT DOCUMENTS 2,652,760  9/1953  Card ................... 172/102
4,155,407  5/1979  Christiansen ......... 172/54.5
4,265,186  5/1981  Nichols ............... 172/102
4,314,609  2/1982  Chauvet .............. 172/54.5

FOREIGN PATENT DOCUMENTS 6805709 10/1969 Netherlands .
1156268  6/1969 United Kingdom ........ 172/54.5

Primary Examiner—Deborah L. Kyle
Assistant Examiner—J. Woodrow Eldred
Attorney, Agent, or Firm—Oblon, Spivak, McClelland, Maier & Neustadt

[57] ABSTRACT

In a machine for working soil, the oscillating arms 6, 7 of the opposite toothed bars 2, 3, 4, 5 on different rows 27, 28 are mounted at least approximately side-by-side in a direction crosswise to the direction of advance 24.

24 Claims, 6 Drawing Sheets

MACHINE FOR WORKING SOIL

FIELD OF THE INVENTION

The invention relates to a machine for working soil comprising a chassis equipped with a device for hitching to a tractor vehicle. At least two rows of one or more bars equipped with soil-working tools are connected to the chassis by a plurality of oscillating arms. The rows are placed behind one another and crosswise to the direction of advance. A device for transforming the rotary movement received from a power source such as the power takeoff of the tractor vehicle into a reciprocal movement crosswise to the direction of advance comprises an eccentric-connecting rods device. The connecting rods serve to transmit the reciprocal movement to the bars to which they are connected by one of their ends.

BACKGROUND OF THE INVENTION

Such a machine for working soil is known in which the bars are connected to the chassis by oscillating arms. For opposite bars in different rows, the oscillating arms are mounted aligned in relation to one another in the direction of advance of the tractor vehicle. This has the consequence of increasing the width of the chassis of the machine for working the soil. This in turn has the consequence of restricting the addition of an accessory device such as a seeder to the back of the known machine by increasing the overhang of the accessory device in relation to the tractor vehicle.

In addition to the exaggerated stresses produced by such a configuration, this brings about problems of roadability of the tractor vehicle by substantially reducing the weight on its front wheels. Another drawback of such a mounting of the oscillating arms is that, to keep the known machine in reasonable proportion, it is necessary to reduce the size of the upper fastenings of the oscillating arms. This has the effect of increasing the stresses induced by the strong stresses produced during working of the soil and amplified by the distance of their point of application from the upper fastenings. This, therefore, considerably reduces the service life of the upper fastenings.

OBJECT OF THE INVENTION

The object of this invention is to solve or substantially ameliorate the foregoing problems found on the existing machine.

SUMMARY OF THE INVENTION

For this purpose, the machine for working soil according to the invention is characterized by the fact that the oscillating arms of the opposite bars on different rows, seen in a direction crosswise to the advance of the machine, are mounted approximately side-by-side. This arrangement makes it possible to reduce considerably the size of the chassis in the direction of advance of the machine.

According to an additional characteristic of the invention, in a pair of rows, the oscillating arms of the front row are directed downwardly and forwardly and the oscillating arms of the back row are directed downwardly and backwardly to be connected to their respective bar.

According to another additional characteristic of the invention, the upper fastenings of the oscillating arms are widened to the maximum so as to distribute in an optimal manner the strong stresses arising from the working conditions of the soil. This improvement is made possible by the new arrangement of the oscillating arms. The decrease of the stresses in the upper fastenings of the oscillating arms substantially increases their service life.

According to another additional characteristic of the invention, the oscillating arms appear as secant when they are seen crosswise to the direction of advance. This shape of the oscillating arms thus makes it possible to have a connection between the lower fastening of an oscillating arm and its upper fastening which is approximately centered on the upper fastening and thus cooperates in the best distribution of the stresses produced during work.

Advantageously, the lowest intersection point of the side-by-side oscillating arms is located as close as possible to the upper fastening. This makes it possible to avoid to a large extent jamming of stones between these oscillating arms, which have a swinging movement crosswise to the direction of advance.

In the invention, the chassis can be placed higher or lower than the upper fastenings of the oscillating arms. Preferably, the chassis is located lower than the upper fastenings of the oscillating arms, which reduces the bulk and height of the machine.

According to an additional characteristic of the invention, the width of the chassis in the direction of advance is approximately equal to the distance measured in the direction of advance between the outside ends of the lower fastenings of two side-by-side oscillating arms.

According to an additional characteristic of the invention, the machine for working soil is equipped with a support and/or leveling device. The support and/or leveling device can be placed at the front and/or at the back of the machine.

DETAILED DESCRIPTION OF THE PRESENTLY PREFERRED EMBODIMENTS

Figure 1:
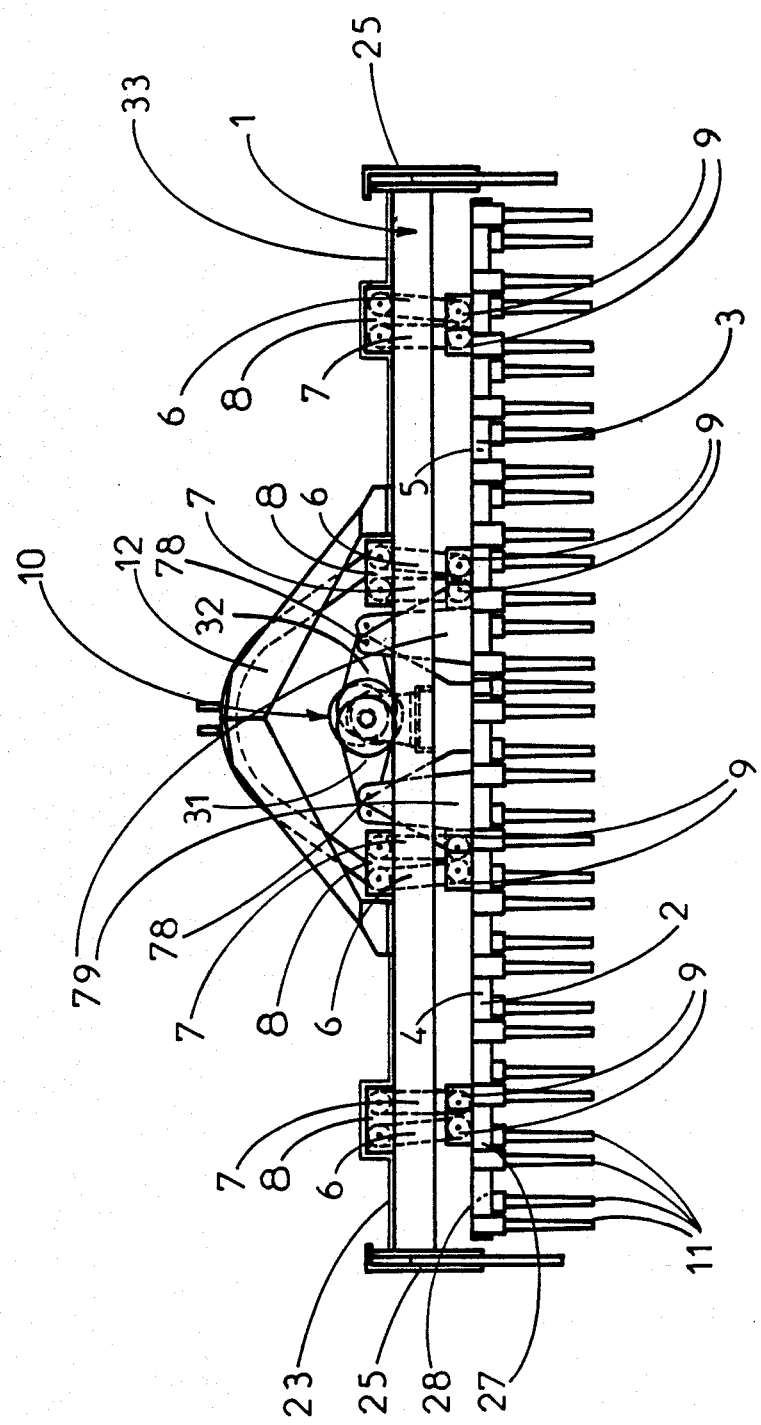
FIG. 1 is a rear view of a first embodiment of a machine for working soil according to the invention, in which the front and back rollers have been removed for better clarity.

FIG. 1 shows a machine for working the soil according to the invention. The machine consists of a chassis 1 to which bars 2, 3, 4, 5 are connected by means of oscillating arms 6, 7. The oscillating arms 6, 7 are articulated at one of their ends in yokes 8 mounted on the chassis 1 and at the other of their ends in yokes 9 mounted on corresponding ones of the bars 2, 3, 4, 5. The oscillating arms 6, 7 will be described in greater detail later.

The bars 2, 3, 4, 5 are driven with an alternating reciprocal movement crosswise to the direction of advance 24 (see FIGS. 2-5) by an eccentric-connecting rods device 10. The eccentric-connecting rods device 10 will be described in greater detail later.

Each bar 2, 3, 4, 5 is equipped with a certain number of work tools such as, for example, teeth 11 fastened in a removable way to the bars 2, 3, 4, 5. The teeth 11 are directly downwardly from the bars 2, 3, 4, 5.

Figure 2:
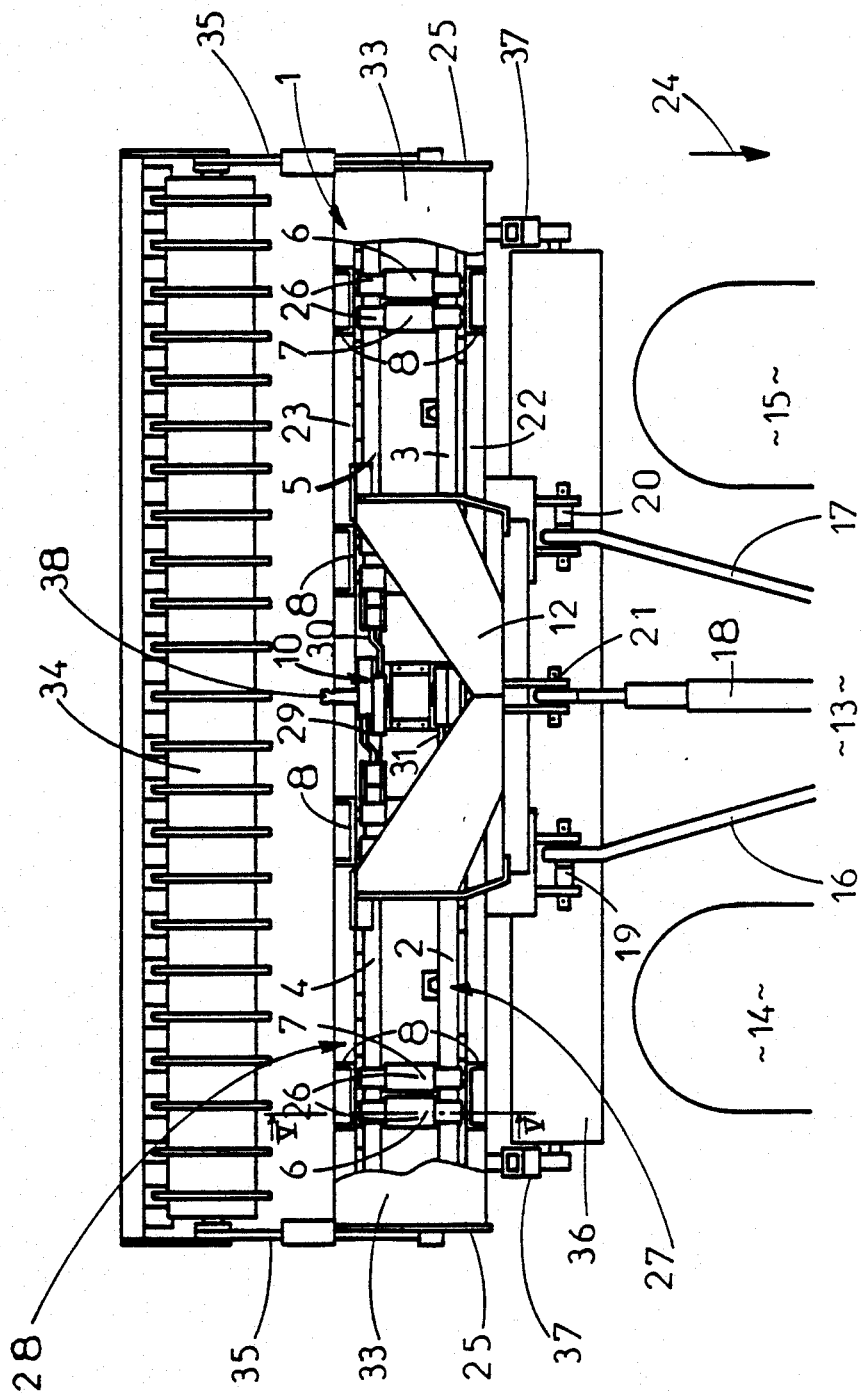
FIG. 2 is a top view of the machine for working soil of FIG. 1 with a partial view of the hood.

Moreover, the machine is also equipped with a hitching device 12 making it possible to fasten it, for example, to the three points hitching system of a tractor vehicle 13 (represented partially in FIG. 2). FIG. 2 shows the rear wheels 14, 15 of the tractor vehicle 13 and the three-point hitching system of the tractor vehicle 13. The three-point hitching system is composed in a known fashion of two lower arms 16, 17 and an upper connecting rod 18.

The hitching device 12 of the machine comprises two lower hitching points 19, 20 which, in use, are connected to the two lower arms 16, 17 of the tractor vehicle 13 and an upper hitching point 21 which, in use, is connected to the upper connecting rod 18.

In FIG. 2, it is clearly shown that the chassis 1 consists of two approximately parallel beams 22, 23 extending crosswise to the direction of advance 24. At each of their ends, the beams 22, 23 are connected to one another by a lateral plate 25 so as to form a rigid unit.

On the upper face of the beams 22, 23, the yokes 8 are fastened so that an upper fastening 26 of each oscillating arms 6, 7 extends to a level higher than that of the beams 22, 23. From the upper fastenings 26, the oscillating arms 6, 7 extend downwardly, crossing the space located between the two beams 22, 23 to join the associated bar 2, 3, 4, 5.

Also seen in FIG. 2 is the arrangement of the bars 2, 3, 4, 5 in two rows 27, 28 crosswise to the direction of advance 24 of the machine. In this example, it is seen that the rows 27, 28 of the bars 2, 3, 4, 5 extend at least approximately parallel to one another and at least approximately parallel to the beams 22, 23 of the chassis 1. In addition, it is seen that the distance between the two rows 27, 28 measured in the direction of advance 24 is less than the distance between the two beams 22, 23 of the chassis 1.

Also seen in FIG. 2 is the eccentric-connecting rods device 10 comprising connecting rods 29, 30, 31, 32. It is to be noted that the eccentric-connecting rods device 10 and the oscillating arms 6, 7 extend, in top view, into the space delimited by the two beams 22, 23 forming the chassis 1.

To the chassis 1 is fastened a hood 33 (seen partially at the ends of the machine) to protect the user from moving elements. The machine for working soil represented in this view is equipped with a rear leveling roller 34 of a type known to a person of the art. The rear leveling roller 34 is connected in a hinged fashion to the chassis 1 of the machine with arms 35 connected at their front end to the lateral plates 25 with the hinge pin directed crosswise to the direction of advance 24 of the machine. The width of the rear leveling roller 34 is at least approximately equal to the working width of the rows 27, 28 of the bars 2, 3, 4, 5.

A support and leveling roller 36 extends at the front of the machine. The support and leveling roller 36 is connected to the chassis 1 of the machine by a connecting device 37 making it possible to adjust the height of the support and leveling roller 36 in relation to the bars 2, 3, 4, 5. The width of the support and leveling roller 36 is at least equal to the distance between the rear wheels 14, 15 of the tractor vehicle 13.

A shaft end 38 is also observed going beyond the rear of the eccentric-connecting rods device 10. The shaft end 38 can be used to drive an additional accessory device for the machine (not shown).

In this embodiment, it is also to be noted that the oscillating arms 6, 7 are grouped in pairs. Each pair consists of an oscillating arm 6 and an oscillating arm 7. In each of the pairs, the upper fastenings 26 are as close as possible to one another.

In addition, still in this embodiment, the oscillating arms 6, 7 associated with the same bar 2, 3, 4, 5 are as far as possible from one another.

Figure 3:
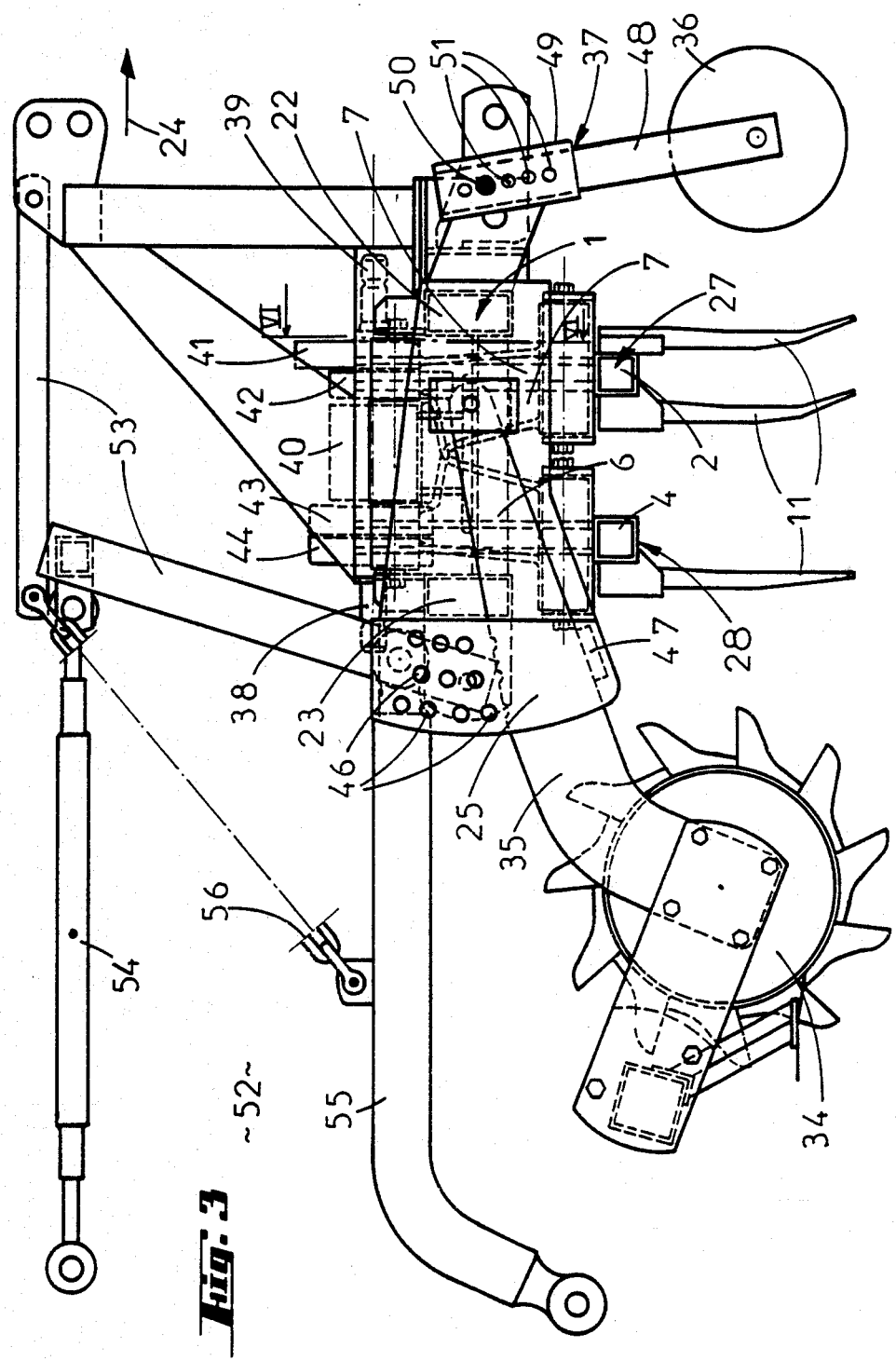
FIG. 3 is a side view of the machine of FIGS. 1 and 2, additionally equipped with a rear hitch.

The machine for working soil of FIGS. 1 and 2 is seen in FIG. 3 in side view. In this FIGURE, one may see an input shaft 39 of the eccentric-connecting rods device 10 which receives the rotary movement of the tractor vehicle 13 via a shaft having universal joints (not shown). The input shaft 39 is guided in rotation by a bearing 40 fastened to the chassis 1.

At the front of the bearing 40, the input shaft 39 supports eccentrics 41, 42 associated with the bars 3, 2 of the front row 27, while at the back of the bearing 40, the input shaft 39 supports eccentrics 43, 44 associated with the bars 5, 4 of the back row 28. At the back, the input shaft 39 ends in the shaft end 38 described above.

In FIG. 3 one may also see the two beams 22, 23 forming the chassis 1 of the machine, as well as the oscillating arm 7 connected to one of the bars (2 or 3) of the front row 27 and the oscillating arm 6 connected to one of the bars (4 or 5) of the back row 28. FIG. 3 also shows the previously described manner in which the oscillating arms 6, 7 cross the space extending between the two beams 22, 23 of the chassis 1.

On the bars 2, 3 of the front row 27, the teeth 11 are mounted alternately at the front and at the back of the bars 2, 3. On the other hand, on the bars 4, 5 of the back row 28, all the teeth 11 are mounted at the back of the bars 4, 5.

In FIG. 3, the rear leveling roller 34 and the arms 35 connecting the rear leveling roller 34 to the lateral plates 25 of the chassis 1 are shown. On the upper back part of the lateral plates 25 of the chassis 1, a certain number of holes 46 are provided, while at their lower back part a stop 47 is provided.

The machine for working soil is also shown in FIG. 3 equipped with the support and leveling roller 36. The connecting device 37 of the support and leveling roller 36 on the chassis 1 of the machine consists of an arm 48 extending to each end of the support and leveling roller 36 and of a corresponding sleeve 49 mounted on the chassis 1. The support and leveling roller 36 is guided in rotation at the lower end of the arms 48. The upper end of each arm 48 is introduced into the corresponding sleeve 49 and is held there axially by means of a pin 50 extending through one of a plurality of holes 51 in the sleeve 49.

In this view, there has additionally been represented a rear hitch 52 making possible the addition of an accessory device to the rear of the machine. The rear hitch 52 consists, on the one hand, of a frame 53 mounted rigidly on the machine for working soil and, on the other hand, of a connecting rod 54 fastened in a hinged manner to the upper part of the frame 53 and of two lower arms 55 also fastened in a hinged manner to the frame 53. The clearance of the lower arms 55 is limited downwardly by means of a chain 56 fastened to the lower arms 55 and to the frame 53. At their back part, the connecting rod 54 and the lower arms 55 thus form a three-point hitching system.

Figure 4:
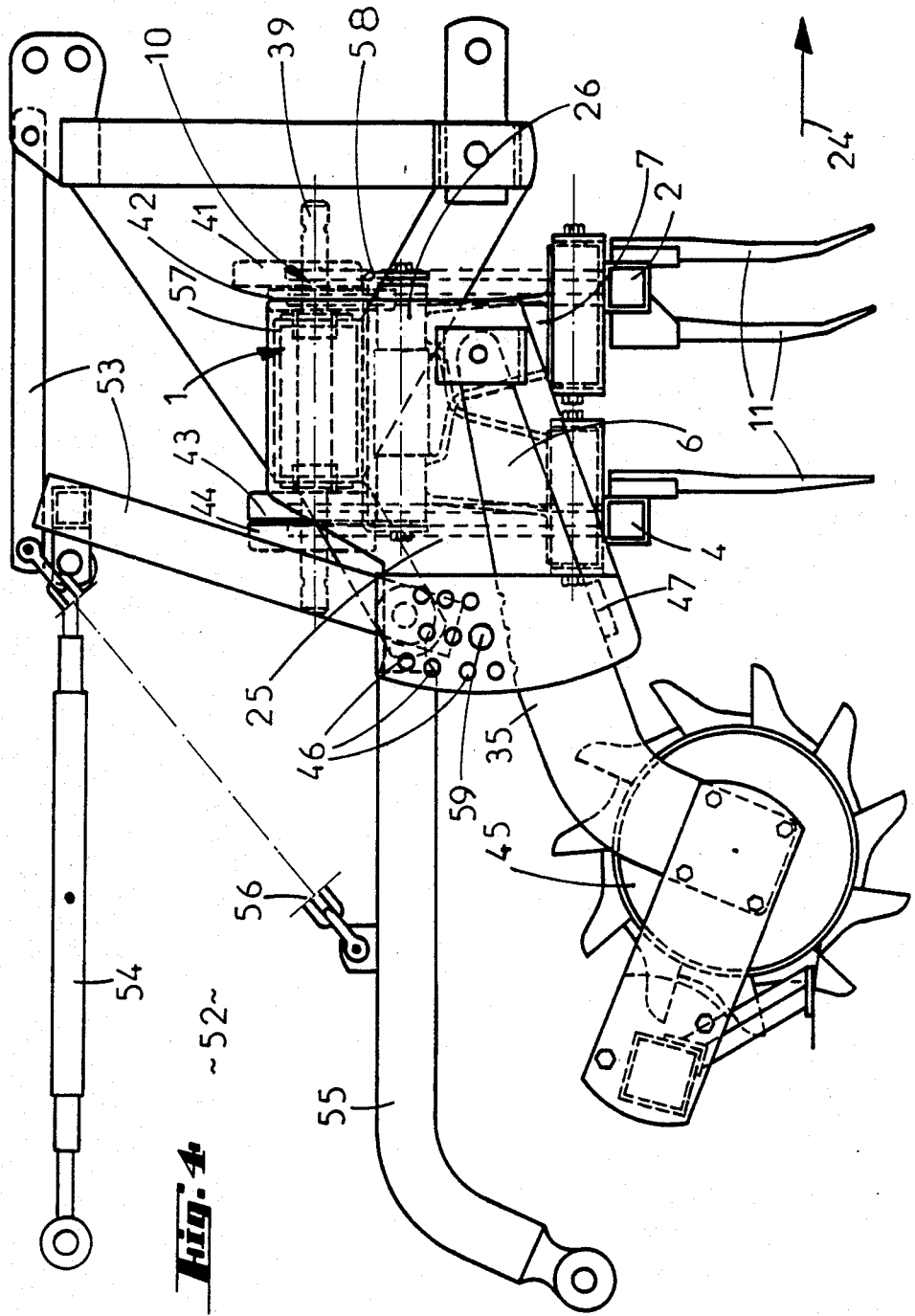
FIG. 4 is a side view of a second embodiment of a machine for working soil according to the invention, also equipped with a rear hitch.

In FIG. 4, which shows a second embodiment of the invention, it can be seen that the chassis 1 of the machine for working the soil consists of a single beam 57 located above the upper fastenings 26 of the oscillating arms 6, 7. Yokes 58 serving to connect the upper fastenings 26 of the oscillating arms 6, 7 to the chassis 1 are fastened to the lower face of the beam 57 and are opened downwardly.

In FIG. 4, the teeth 11 of the rear bars 4, 5 are mounted in front of the bars 4, 5. However, it is to be noted that the distance separating the rear teeth 11 from the front bars 2, 3 and the front teeth 11 from the rear bars 4, 5 remain at least approximately the same as in the example of FIGS. 1-3. The beam 57 also serves as a bearing for the input shaft 39 of the eccentric-connecting rods device 10. At the front of the beam 57 are fastened (on the input shaft 39) eccentrics 41, 42 associated with the front bars 3, 2, while the eccentrics 43, 44 associated with the rear bars 5, 4 extend at the rear of the beam 57.

In this embodiment, there is provided no front support and leveling roller 36. Instead, the depth of work of the teeth 11 of this machine is determined by a rear roller 45 which also performs a support function. For this purpose, the beam 57 comprises at each of its ends a lateral plate 25. As in the preceding example, the rear roller 45 is connected in a hinged manner to the lateral plates 25 by means of two arms 35. The lateral plates 25 comprise (as previously described) in their upper back part holes 46 and in the lower part a stop 47. A pin 59 driven into one of the holes 46 of each lateral plate 25 cooperates with the associated arm 35 of the rear roller 45 to limit its clearance upwardly.

All the elements of the machine of FIG. 4 common to the machine represented in FIGS. 1-3 have not been redescribed.

Figure 5:
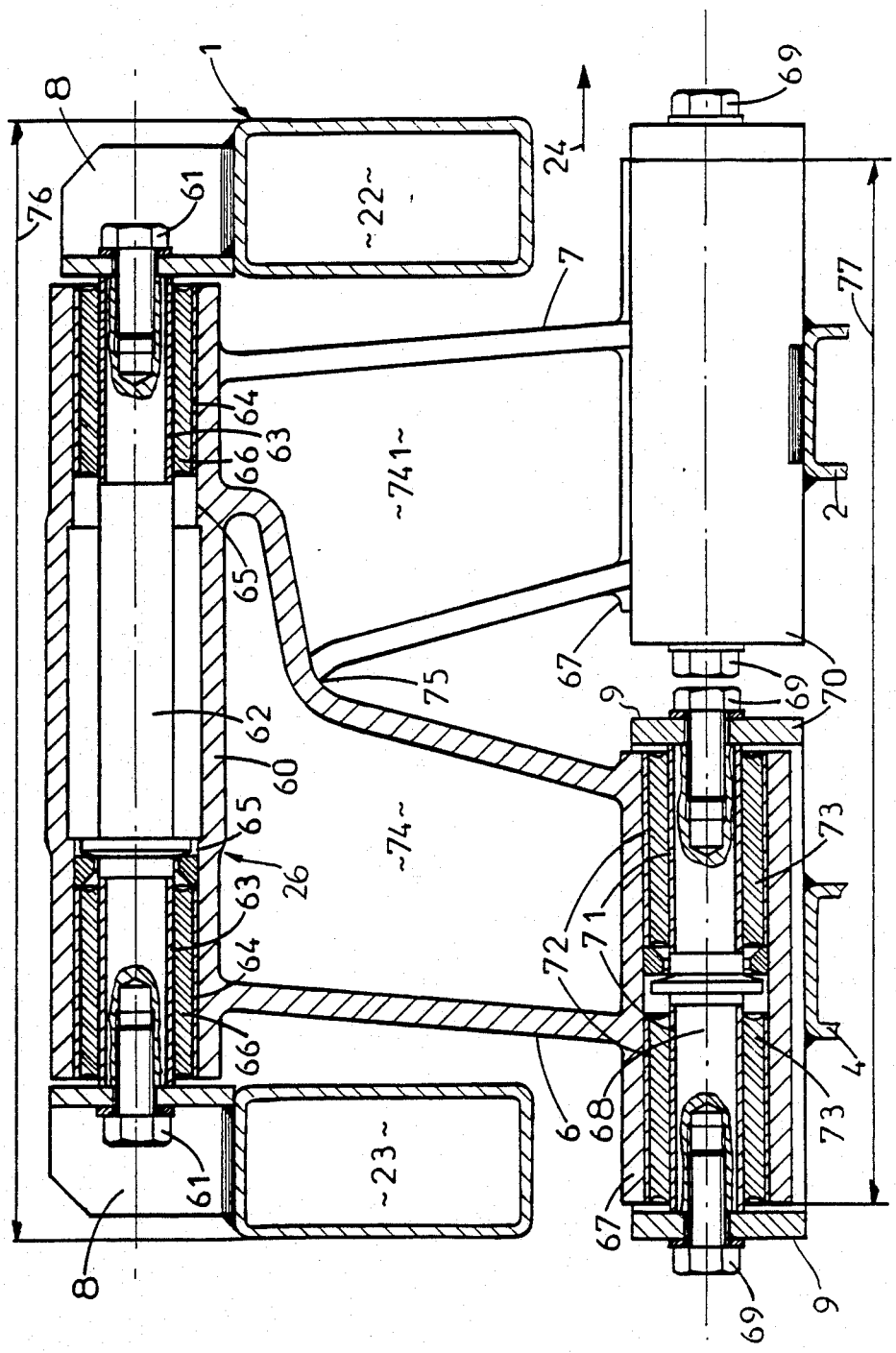
FIG. 5 is a partial side view on a larger scale in section along plane v—v of FIG. 2 of two oscillating arms mounted side-by-side.

In FIG. 5, seen totally in section, is one of the oscillating arms 6 connected the bar 4 and, to/ in the background and partially hidden, one of the oscillating arms 7 connected to the bar 3. It is to be noted in this FIGURE that the upper fastening 26 of the oscillating arms 6, 7 (here that of the oscillating arms 6) occupies approximately the entire space available between the two beams 22, 23 of the chassis 1. It is also seen that the yokes 8 are located above the beams 22, 23. This makes it possible in particular to save in height the bulk of the beams 22, 23.

The upper fastening 26 of the oscillating arm 6 consists of a tubular element 60 solid with the oscillating arm 6 and mounted concentrically to a shaft 62. The shaft 62 is connected by fastening means 61 to the half-yokes constituting the yoke 8.

The shaft 62 is connected to the tubular element 60 by an elastic device at each of its ends. Each elastic device consists of an inside tube 63 tight mounted on the shaft 62 and an outside tube 64 tight mounted in one of a plurality of bores 65 made for this purpose at each end of the tubular element 60. Each inside tube 63 is connected to the corresponding outside tube 64 by an elastic cylinder 66. This elastic device makes possible a certain rotation of the oscillating arm 6 around the shaft 62.

Also, the lower fastening of the oscillating arm 6 consists of a tubular element 67 connected to the oscillating arm 6 and mounted concentrically to a shaft 68. The shaft 68 is connected by connecting means 69 to one of the yokes 9. The shaft 68 is connected to the tubular element 67 by an elastic device at each of its ends. Each elastic device consists of an inside tube 71 tight mounted on the shaft 68 and an outside tube 72 tight mounted in the tubular element 67. Each inside tube 71 is connected to the corresponding outside tube 72 by an elastic cylinder 73 that also allows a certain rotation of the oscillating arm 6 around the shaft 68.

Although it is not shown, it will be understood that the upper and lower fastenings of an oscillating arm 7 are identical with those of an oscillating arm 6.

In this view, there is also clearly seen the shape of the oscillating arms 6, 7. A rear oscillating arm 6 has its lower tubular element 67 offset backwardly in relation to its upper tubular element 60 so as to be able to be connected to one of the rear bars 4, 5. For this purpose, the upper tubular elements 60 and the lower tubular elements 67 of the same rear oscillating arm 6 are connected to one another by a web 74 extending backwardly and downwardly. In addition, it is seen that the web 74 is wider in its upper part than in its lower part. It is also seen that the connection of the web 74 to the upper tubular element 60 is at least approximately centered in relation to the upper tubular element 60.

A front oscillating arm 7, on the other hand, intended to be connected to a front bar 2, 3, has its lower tubular element 67 offset forwardly in relation to its upper tubular element 60 so as to be able to be connected to one of the front bars 2, 3. For this purpose, the upper tubular element 60 and the lower tubular element 67 of the same oscillating arm 7 are connected to one another by a web 741 extending forwardly and downwardly. In its upper part, the web 741 is also wider than in its lower part. Also, the connection of the web 741 to the upper tubular element 60 is also at least approximately centered in relation to the upper tubular element 60.

In addition, in FIG. 5 it can be seen that, to reduce as much as possible the risk of jamming of stones or other hard bodies between two oscillating arms 6, 7 located side-by-side, the point 75 (actually, of course, the locus of points) of the lowest horizontal line where the forward face of the oscillating arm 6 is as far forward as the rearward face of the oscillating arm 7 is located as high as possible in relation to the bars 2, 3, 4, 5.

It is further seen in FIG. 5 that the width 76 measured in the direction of advance 24 between the two beams 22, 23 of the chassis 1 is at least approximately equal to the distance 77 measured in the direction of advance 24 between the outside ends of the lower tubular element 67 of the oscillating arms 6, 7.

Figure 6:
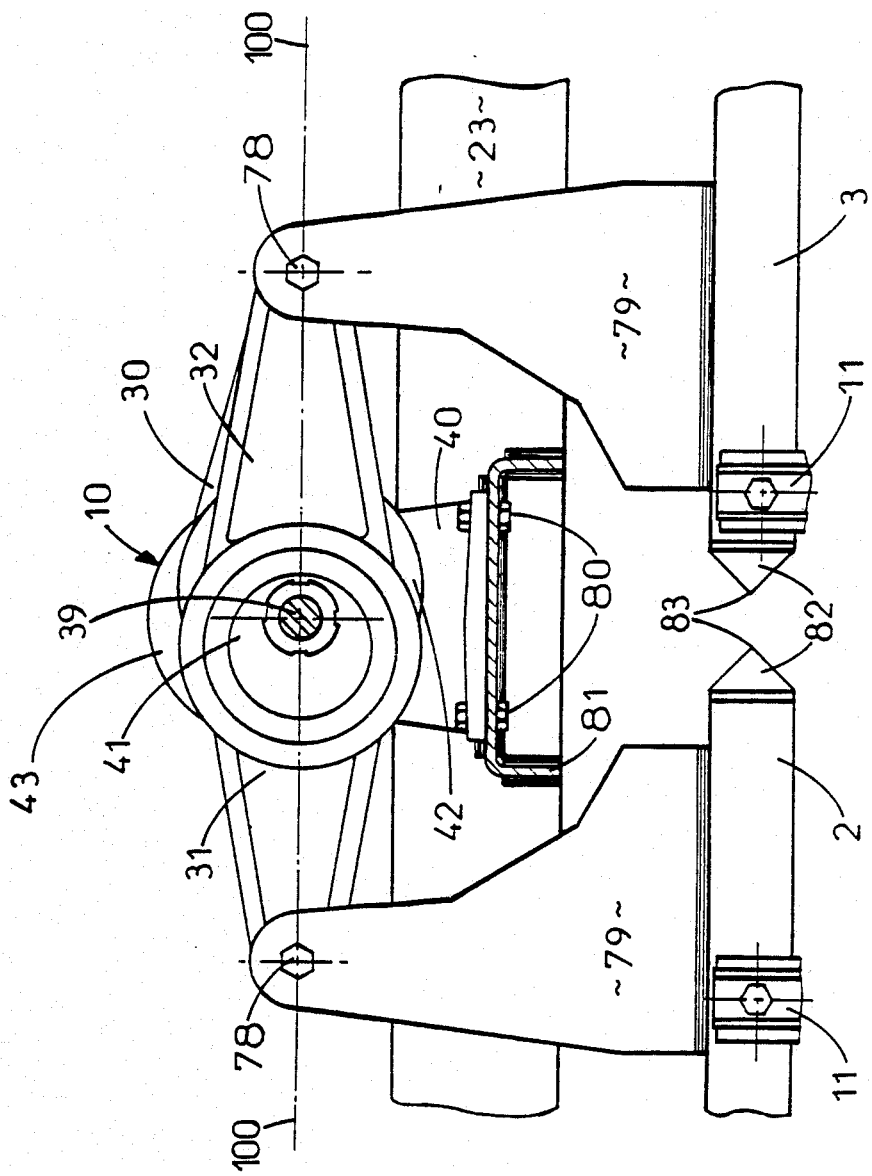
FIG. 6 is a partial front view in section along the plane VI—VI of FIG. 3 of the eccentric-connecting rods system.

In FIG. 6, seen from the front is the eccentric-connecting rods device 10 which drives the bars 2, 3, 4, 5. As stated above, the rotary movement of the power takeoff of the tractor vehicle 13 is transmitted by a transmission shaft with universal joints (not shown) to the input shaft 39. On the input shaft 39 are mounted the eccentrics 41, 42, 43, 44. Each of the eccentrics 41, 42, 43, 44 cooperates with a corresponding one of the connecting rods 32, 31, 30, 29 to transform the rotary movement of the input shaft 39 into an alternating reciprocal movement transmitted by the small end of the connecting rods 32, 31, 30, 29 to the associated bar 3, 2, 5, 4. Each of the small ends of the connecting rods 32, 31, 30, 29 is fastened as shown in FIG. 6 by an articulation 78 to a yoke 79, and each of the yokes 79 is itself solid with a corresponding one of the bars 3, 2, 5, 4. Each of the connecting rods 32, 31, 30, 29 exhibits a plane of symmetry 100 containing the axis of the corresponding articulation 78. Each of the yokes 79 extends to the inside end of the corresponding one of the bars 3, 2, 5, 4, with which it is solid.

For a good transmission of the drive movement of the bars 3, 2, 5, 4, the articulation 78 of the corresponding one of the connecting rods 32, 31, 30, 29 on the corresponding one of the yokes 79 is located at a certain height in relation to the bars 3, 2, 5, 4. The height of each articulation 78 is such that the projection of the axis of rotation of the shaft 39 in the plane of FIG. 6, and the projections of the axes of rotation of an articulation 78 on the left and of an articulation 78 on the right in the same plane of FIG. 6, are at least approximately aligned on the same at least approximately horizontal straight line when the connecting rods 32, 31, 30, 29 of the left and right articulation 78 under consideration are at the dead center of their movement.

This arrangement makes it possible to balance intrinsically with the eccentric-connecting rods device 10 the part of the connecting rods 32, 31, 30, 29 under consideration as having an alternating movement.

In addition, by observing simultaneously FIGS. 2 and 6, it will be noted that the eccentrics 41, 42, 43, 44 are distributed in a balanced way over the 360° of the axis of rotation of the shaft 39. This means that, if the eccentric 41 is taken as a reference, the eccentric 43 is out of phase 90° from it; the eccentric 42 is also out of phase 90° in relation to the eccentric 43; and therefore the phase shift of the eccentric 42 in relation to the eccentric 41 is 180°, and the two adjacent eccentrics 41, 42 are in phase opposition. The same holds true for the pair of eccentrics 43, 44, because the eccentric 44 is out of phase 90° in relation to the eccentric 42 which, as said above, is itself out of phase 90° in relation to the eccentric 43. The intrinsic imbalance of the eccentrics 41, 42, 43, 44 is therefore cancelled with respect to the overall device.

This arrangement, in addition to achieving dynamic and static balance of the rotating masses consisting of the eccentrics 41, 42, 43, 44 and the part of the connecting rods 32, 31, 30, 29 considered as having a rotary movement, makes it possible to obtain a greater regularity of the torque transmitted to the machine.

The device consisting of the input shaft 39 and the eccentrics 41, 42, 43, 44 is supported by the bearing 40. The bearing 40 is connected by fastening means 80 to a crosspiece 81 extending between the two beams 22, 23 of the chassis 1, parallel to the direction of advance 24. The crosspiece 81 also contributes to the rigidity of the chassis 1.

It is also seen in FIG. 6 that the end 82 of each bar 2, 3, 4, 5 has a shape able to cooperate with the one opposite on the adjacent bar 2, 3, 4, 5 on the same row 27, 28 to push back in all directions objects which are found between the ends 82 when they draw near to one another. Preferably, and as is shown, the shapes of the opposite ends 82 each have a top 83 so as to make more effective the disengagement of the stones that are found between two adjacent bars 2, 3, 4, 5. Advantageously, the shape of the end 82 of each bar 2, 3, 4, 5 is conical, preferably pyramidal.

DESCRIPTION OF OPERATION

Machines for working soil according to this invention and as they are shown in FIGS. 1, 2, 3, 4, 5, and 6, function as described below.

The machine for working soil is fastened to a tractor vehicle 13 by the hitching device 12 solid with the chassis 1. On the chassis 1, the bars 2, 3, 4, 5 are suspended by the oscillating arms 6, 7 crosswise to the direction of advance 24.

The oscillating arms 6, 7 being fastened, on the one hand, to the chassis 1 and, on the other hand, to the bars 2, 3, 4, 5 by elastic cylinder articulations 63, 64, 66; 71, 72, 73, the bars 2, 3, 4, 5 can have a pendular movement, of small amplitude, on both sides of their equilibrium position.

At the front of the machine is the input shaft 39, which is connected to the power takeoff of the tractor vehicle 13 by a shaft having universal joints which transmits the rotary movement of the power takeoff to the input shaft 39.

The eccentrics 41, 42, 43, 44 are mounted on the input shaft 39. The input shaft 39—eccentrics 41, 42, 43, 44 unit forms a device similar to a crank shaft. On each of the eccentrics 41, 42, 43, 44 is mounted a connecting rod 32, 31, 30, 29 by its big end. The small end of each connecting rod 32, 31, 30, 29 is articulated on a corresponding one of the yokes 79, which are solid with the bars 3, 2, 5, 4. The eccentric-connecting rods device 10 thus created transforms the rotary movement received by the input shaft 39 into alternate and reciprocal movement transmitted by the small ends of the connecting rods 32, 31, 30, 29 to the bars 3, 2, 5, 4.

On the bars 3, 2, 5, 4 are mounted teeth 11 penetrating into the soil by their lower ends. By the alternating reciprocal movement of the teeth 11 crosswise to the direction of advance 24, the teeth 11 work the soil and break up clods of earth found there.

The support and leveling roller 36 can be adjusted in height thanks to its connecting device 37. This adjustment makes it possible to control the penetration of the teeth 11 in the soil and thus to have the desired working depth. The support and leveling roller 36 by rolling over the soil also has, because of its width, a second role—which is to level the soil before the passage of the machine by eliminating the tracks of the wheels 14, 15 that the tractor vehicle 13 leaves behind it.

The rear leveling roller 34 has connecting arms 35 that are floating in height. Therefore, the rear leveling roller 34 always remains at the level of the soil, and its role is to repack the soil and to level the soil after the work of the teeth 11 by rolling over the soil.

On the other hand, the machine for working the soil shown in FIG. 4 has no support and leveling roller 36 at its front. In this embodiment, it is the rear roller 45 which, in addition to a leveling role that is comparable to that of the rear leveling roller 34 described above, has a role of supporting the machine and controlling the working depth of the teeth 11. In this configuration, the rear roller 45 can support the machine for working the soil because each of its two arms 35, when the machine penetrates into the soil, strikes upwardly against the corresponding pin 59 placed in one of the holes 46 as a function of the working depth that is desired.

Caveat

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A machine for working soil, said machine comprising:
   (a) a chassis having a direction of advance during use of said machine;
   (b) a device mounted on said chassis for hitching said machine to a tractor source;
   (c) a first row comprising two bars at least approximately aligned in a direction crosswise to said direction of advance and equipped with tools for working the soil;
   (d) a second row comprising two bars at least approximately aligned in a direction crosswise to said direction of advance and equipped with tools for working the soil, said second row being placed behind said first row in said direction of advance;
   (e) a bearing mounted on said chassis;
   (f) a shaft having an axis of rotation which is at least approximately parallel to said direction of advance journaled in said bearing, said shaft being adapted to be rotated around its axis of rotation by a power source;
   (g) a plurality of eccentrics mounted on said shaft, said plurality of eccentrics being distributed around said axis of rotation of said shaft;
   (h) a plurality of connecting rods each one of which has a first end and a second end, the first end of each one of said plurality of connecting rods being connected to a corresponding one of said plurality of eccentrics, and the second end of each one of said plurality of connecting rods being pivotally connected to a corresponding one of said bars;
   (i) a plurality of first rigid oscillating arms, wherein;
      (i) each one of said plurality of first oscillating arms has a first upper articulation means and a first lower articulation means
      (ii) each one of said first upper articulation means is pivotally connected to a corresponding one of a plurality of first upper articulation members mounted on said chassis so as to form a first upper articulation
      (iii) each one of said first lower articulation means is pivotally connected to a corresponding one of a plurality of first lower articulation members mounted on a corresponding one of said bars of said first row, so as to form a first lower articulation and
      (iv) each one of said first upper and lower articulations has an axis at least approximately parallel to said direction of advance
   (j) a plurality of second rigid oscillating arms wherein:
      (i) each one of said plurality of second oscillating arms has a second upper articulation means and a second lower articulation means
      (ii) each one of said second upper articulation means is pivotally connected to a corresponding one of a plurality of second upper articulation members mounted on said chassis, so as to form a second upper articulation
      (iii) each one of said second lower articulation means is pivotally connected to a corresponding one of a plurality of second lower articulation members mounted on a corresponding one of said bars of said second row, so as to form a second lower articulation and
      (iv) each one of said second upper and lower articulations has an axis at least approximately parallel to said direction of advance; and
   (k) said first and second oscillating arms being arranged in a plurality of pairs of oscillating arms each one of which comprises a first oscillating arms and a second oscillating arm and wherein:
      (i) said pairs of oscillating arms are spaced from each other crosswise to said direction of advance
      (ii) in each one of said pairs of oscillating arms, said first and second upper articulations extend side-by-side crosswise to said direction of advance and
      (iii) in each one of said pairs of oscillating arms, said second lower articulation is offset backwardly in respect to said first lower articulation when considering said direction of advance.

2. A machine for working soil according to claim 1 wherein in each pair of oscillating arms said first and second upper articulations extend close to one another.

3. A machine for working soil according to claim 1 wherein:
   (a) each one of said bars has two extremities;
   (b) each one of said bars of said first row is connected to two first oscillating arms;
   (c) each one of said two first oscillating arms is arranged near a corresponding one of said two extremities of said bar of said first row;
   (d) each one of said bars of said second row is connected to two second oscillating arms; and
   (e) each one of said two second oscillating arms is arranged near a corresponding one of said two extremities of said bar of said second row.

4. A machine for working soil according to claim 2 wherein:
   (a) each one of said first oscillating arms comprises a first web having an upper end connected to said first upper articulation means and a lower end connected to said first lower articulation means;
   (b) each one of said second oscillating arms comprises a second web having an upper end connected to said second upper articulation means and a lower end connected to said second lower articulation means;
   (c) each one of said first webs extends from the corresponding first upper articulation means downwardly and forwardly to the corresponding first lower articulation means;
   (d) each one of said second webs extends from the corresponding second upper articulation means downwardly and backwardly to the corresponding second lower articulation means; and
   (e) in each pair of oscillating arms, said first and second webs appear as secant near their respective upper ends when seen crosswise to the direction of advance.

5. A machine according to claim 1 wherein said chassis extends above said first and second upper articulations.

6. A machine according to claim 5 wherein said chassis comprises a single beam.

7. A machine for working soil according to claim 1 wherein said chassis extends lower as said first and second upper articulations.

8. A machine for working soil according to claim 7 wherein:
   (a) said chassis comprises two beams; and (b) said plurality of first and second oscillating arms extend between said two beams.

9. A machine for working soil according to claim 8 wherein:
(a) said chassis has a predetermined width in said direction of advance;
(b) each one of said first lower articulations has a forward side;
(c) each one of said second lower articulations has a backward side;
(d) said forward side and said backward side extend at a predetermined distance from each other in said direction of advance; and
(e) said predetermined width is approximately equal to said predetermined distance.

10. A machine for working soil according to claim 1 wherein:
(a) each one of said bars has an extremity extending near said eccentrics; and
(b) each one of said connecting rods is connected to the corresponding bar in the vicinity of said extremity.

11. A machine for working soil according to claim 1 wherein:
(a) each one of said first upper articulations comprises a first upper elastic bearing; and
(b) each one of said second upper articulations comprises a second upper elastic bearing.

12. A machine for working soil according to claim 11 wherein:
(a) each one of said first upper elastic bearings comprises at least one first upper elastic cylinder;
(b) each one of said second upper elastic bearings comprises at least one second upper elastic cylinder;
(c) each one of said first upper articulation means comprises a first upper tubular element and a first upper shaft passing through said first upper tubular element and coaxially connected to said first upper tubular element by said at least one first upper elastic cylinder;
(d) each one of said first upper articulation members comprises a first upper yoke, said corresponding first upper shaft being solidly connected to said first upper yoke;
(e) each one of said second upper articulation means comprises a second upper tubular element and a second upper shaft passing through said second upper tubular member and coaxially connected to said second upper tubular element by said at least one second upper elastic cylinder; and
(f) each one of said second upper articulation members comprises a second upper yoke, said corresponding second upper shaft being solidly connected to said second upper yoke.

13. A machine for working soil according to claim 1 wherein:
(a) each one of said first lower articulations comprises a first lower elastic bearing; and
(b) each one of said second lower articulations comprises a second lower elastic bearing.

14. A machine for working soil according to claim 13 wherein:
(a) each one of said first lower elastic bearings comprises at least one first lower elastic cylinder;
(b) each one of said second lower elastic bearings comprises at least one second lower elastic cylinder;
(c) each one of said first lower articulation means comprises a first lower tubular element and a first lower shaft passing through said first lower tubular element and coaxially connected to said first lower tubular element by said at least one first lower elastic cylinder;
(d) each one of said first lower articulation members comprises a first lower yoke, said corresponding first lower shaft being solidly connected to said first lower yoke;
(e) each one of said second lower articulation means comprises a second lower tubular element and a second lower shaft passing through said second lower tubular member and coaxially connected to said second lower tubular element by said at least one second lower elastic cylinder; and
(f) each one of said second lower articulation members comprises a second lower yoke, said corresponding second lower shaft being solidly connected to said second lower yoke.

15. A machine for working soil according to claim 1 and further comprising a hood which in hop view covers at least approximately totally said first and second upper articulations.

16. A machine for working soil according to claim 1 and further comprising a support device mounted on said chassis.

17. A machine for working soil according to claim 16 wherein said support device can be adjusted in height.

18. A machine for working soil according to claim 16 wherein:
(a) said chassis has a front part when considering said direction of advance; and
(b) said support device extends to said front part of said chassis.

19. A machine for working soil according to claim 16 wherein:
(a) said chassis has a rear part when considering said direction of advance; and
(b) said support device extends to said rear part of said chassis;

20. A machine for working soil according to claim 16 wherein said support device comprises a roller.

21. A machine for working soil according to claim 1 wherein:
(a) said chassis has a front part when considering said direction of advance; and
(b) a leveling device is mounted at said front of said chassis.

22. A machine for working soil according to claim 21 wherein said leveling device can be adjusted in height.

23. A machine for working soil according to claim 21 wherein said leveling device comprises a roller.

24. A machine for working soil, said machine comprising:
(a) a chassis having a direction of advance during use of said machine;
(b) a device mounted on said chassis for hitching said machine to a tractor vehicle;
(c) a first row comprising one or more bars placed crosswise to said direction of advance and equipped with tools for working the soil;
(d) a second row comprising one or more bars placed crosswise to said direction of advance and equipped with tools for working the soil, said second row being placed behind said first row in said direction of advance;
(e) a bearing mounted on said chassis;

(f) an input shaft having an axis of rotation which is at least approximately parallel to said direction of advance journaled in said bearing, said input shaft being adapted to be rotated around its axis of rotation by a power source on the tractor vehicle;

(g) a plurality of eccentrics mounted on said input shaft, said plurality of eccentrics being distributed symmetrically around said axis of rotation of said input shaft;

(h) a plurality of connecting rods each one of which has a first end and a second end, the first end of each one of said plurality of connecting rods being connected to a corresponding one of said plurality of eccentrics;

(i) a plurality of first yokes each one of which has a first end and a second end, the first end of each one of said plurality of first yokes being pivotally connected to the second end of a corresponding one of said plurality of connecting rods and the second end of each one of said plurality of first yokes being connected to a corresponding one of said bars;

(j) a plurality of pairs of second yokes mounted on said chassis, each one of said plurality of pairs of second yokes being spaced from each other in said direction of advance;

(k) a plurality of first tubular elements, each one of said plurality of first tubular elements being mounted for pivotal movement on a corresponding one of said pairs of second yokes;

(l) a plurality of third yokes mounted on each one of said bars in said first row, each one of said plurality of pairs of third yokes being spaced from each other in the direction of advance;

(m) a plurality of pairs of fourth yokes mounted on each one of said bars in said second row, each one of said plurality of pairs of fourth yokes being spaced from each other in the direction of advance;

(n) a plurality of second tubular elements, each one of said plurality of second tubular elements being mounted for pivotal movement on a corresponding one of said pairs of third yokes;

(o) a plurality of third tubular elements, each one of said plurality of third tubular elements being mounted for pivotal movement on a corresponding one of said pairs of fourth yokes;

(p) a plurality of first webs each one of which has a first end connected to a corresponding one of said plurality of first tubular elements and a second end connected to a corresponding one of said plurality of second tubular elements; and (q) a plurality of second webs each one of which has a first end connected to a corresponding one of said plurality of first tubular elements and a second end connected to a corresponding one of said plurality of third tubular elements.

* * * * *